W. HAUSNER & A. SCHWEIGERT.
REFRIGERATOR.
APPLICATION FILED MAY 5, 1913.

1,072,453.

Patented Sept. 9, 1913.

Witnesses

Inventor
William Hausner
Albert Schweigert
By John A. Bommhardt
Attorney

UNITED STATES PATENT OFFICE.

WILLIAM HAUSNER AND ALBERT SCHWEIGERT, OF CLEVELAND, OHIO.

REFRIGERATOR.

1,072,453.  Specification of Letters Patent.  Patented Sept. 9, 1913.

Application filed May 5, 1913. Serial No. 765,653.

*To all whom it may concern:*

Be it known that we, WILLIAM HAUSNER and ALBERT SCHWEIGERT, citizens of the United States, residing at Cleveland, in the county of Cuyahoga and State of Ohio, have invented certain new and useful Improvements in Refrigerators, of which the following is a specification.

This invention relates to refrigerators, and has for its object to provide a refrigerator with an improved weighing attachment or scales whereby the amount of ice placed in the refrigerator box will be registered on a dial at the front of the refrigerator, the device also acting as an indicator to show whether there is ice in the refrigerator, and the amount thereof.

The device will be found serviceable for checking up ice men, and convenient for determining whether more ice is needed at any time.

The invention is illustrated in the accompanying drawings in which—

Figure 1:
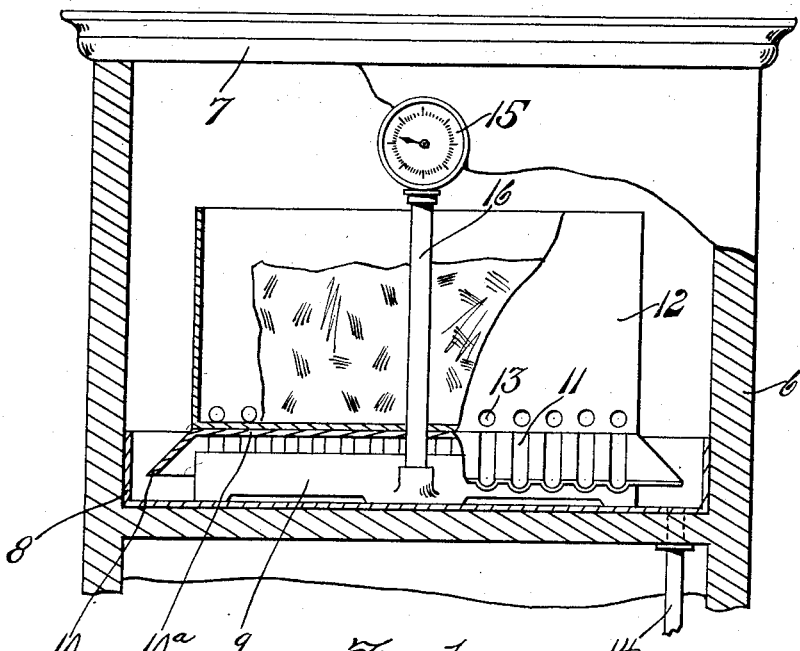
Figure 2:
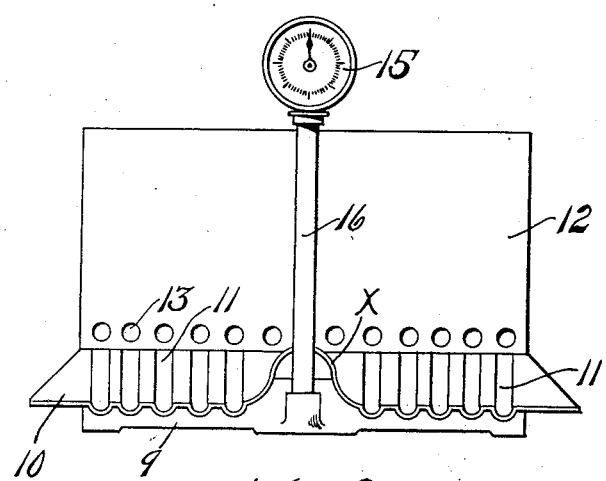

Figure 1 is a partial sectional view of the device as applied to a refrigerator. Fig. 2 is a front elevation of the weighing attachment removed from the refrigerator.

Referring specifically to the drawings 6 indicates the ice box of a refrigerator and 7 a lid thereon. A pan 8 is located in the bottom of the box, to collect drippings, and a waste pipe 14 leads therefrom.

9 is the casing or frame of the scales, of the platform type. This sets in the pan 8, the registering mechanism communicates through a pipe 16 to a dial 15 exposed at the front of the refrigerator, in an opening in the wall thereof, the weights being indicated by a pointer coöperating with the dial.

The platform of the scale comprises or consists of a plate $10^a$ having at its edge a downwardly inclined flange 10 which covers the scale mechanism, and this flange has grooves 11 to conduct the drip from holes 13 in the sides of a box 12 which rests on the platform $10^a$, and which contains the piece of ice.

The ice when delivered is placed in the box 12 and the weight thereof is indicated on the dial. As the ice melts the water drips through the holes 13 and grooves 11 to the pan 8 and the waste pipe. The dial will indicate, at any time, the amount of ice then in the box. The box 12 is fastened to the platform $10^a$ and therefore the weight of the ice will be indicated without respect to the particular position of the ice in the box, since the box moves up and down as the weight is increased or decreased. Therefore in this respect it is superior to attachments in which the ice rests on a flat plate at the bottom of the compartment and may slide or be placed against the fixed wall of an ice compartment in which event the true weight will not be registered. The box 12 is spaced from the refrigerator wall, so that there is an air space between the box and the wall of the refrigerator, thus permitting a circulation of air around the same. The flange 10 of the platform is bent up around the pipe 16, as indicated at X in Fig. 2, thus providing a space for the passage of said pipe.

What we claim as new is:

1. The combination with the ice compartment of a refrigerator, of a drip pan in the bottom thereof, a weighing scale in said pan having a platform plate with downwardly inclined flanges at the edge projecting beside the scale frame, and an ice box mounted on said plate having drip openings discharging onto said flange, and a weight indicator operated by the scale.

2. The combination with the ice compartment of a refrigerator, of a drip pan in the bottom thereof, a weighing scale in said pan having a platform plate with flanges at the outer edge thereof projecting downwardly and outwardly between the scale and the sides of the pan, an ice box with sides, mounted on said plate and having drip openings in the sides, an indicator at the front of the refrigerator operated by the weighing scale, and a tubular connection between the scale casing and the indicator casing.

In testimony whereof, we do affix our signatures in presence of two witnesses.

WILLIAM HAUSNER.
ALBERT SCHWEIGERT.

Witnesses:
JOHN A. BOMMHARDT,
EDWARD J. HOBDAY.